United States Patent
Endo et al.

(10) Patent No.: US 9,067,588 B2
(45) Date of Patent: Jun. 30, 2015

(54) VEHICLE AND VEHICLE CONTROL METHOD

(71) Applicant: TOYOTA JIDOSHA KABUSHIKI KAISHA, Toyota (JP)

(72) Inventors: Hiroki Endo, Nissin (JP); Koji Hokoi, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/449,464

(22) Filed: Aug. 1, 2014

(65) Prior Publication Data
US 2015/0038287 A1    Feb. 5, 2015

(30) Foreign Application Priority Data
Aug. 5, 2013 (JP) ................. 2013-162458

(51) Int. Cl.
| | |
|---|---|
| B60K 1/02 | (2006.01) |
| B60W 20/00 | (2006.01) |
| B60W 10/06 | (2006.01) |
| B60W 10/08 | (2006.01) |
| B60K 6/48 | (2007.10) |

(52) U.S. Cl.
CPC ............... *B60W 20/10* (2013.01); *B60W 10/06* (2013.01); *B60W 10/08* (2013.01); *Y10S 903/93* (2013.01); *B60K 6/48* (2013.01); *B60W 20/00* (2013.01); *B60W 2510/244* (2013.01); *B60W 2540/10* (2013.01); *B60W 20/40* (2013.01)

(58) Field of Classification Search
None
See application file for complete search history.

(56) References Cited

U.S. PATENT DOCUMENTS

| | | |
|---|---|---|
| 2009/0192660 A1 | 7/2009 | Tamor et al. |
| 2011/0295456 A1 | 12/2011 | Yamamoto et al. |
| 2013/0144514 A1 | 6/2013 | Choi et al. |
| 2013/0166125 A1 | 6/2013 | Yamamoto et al. |
| 2013/0274981 A1 | 10/2013 | Kraemer |

FOREIGN PATENT DOCUMENTS

| | | |
|---|---|---|
| DE | 102011005803 A1 | 9/2012 |
| JP | 2010-188948 A | 9/2010 |
| JP | 2010-234872 A | 10/2010 |
| JP | 2010-234873 A | 10/2010 |
| JP | 20 13-035336 A | 2/2013 |
| JP | 2013-067337 A | 4/2013 |
| WO | 2011/030444 A1 | 3/2011 |

*Primary Examiner* — Justin Holmes
(74) *Attorney, Agent, or Firm* — Kenyon & Kenyon LLP (57) ABSTRACT

In a vehicle and a vehicle control method, when conditions i) and ii) are satisfied, an electronic control unit is configured to control an internal combustion engine so as to delay starting of the internal combustion engine, which is based on a condition where a vehicle request power is greater than a start threshold value, in a first mode than that in a second mode. The condition i) is a condition in which the driving mode is the first mode and the condition ii) is a condition in which the vehicle request power requested by the vehicle is greater than the start threshold value. The start threshold value is a value with which the internal combustion engine in a stopped state is started.

8 Claims, 5 Drawing Sheets

VEHICLE AND VEHICLE CONTROL METHOD

INCORPORATION BY REFERENCE

The disclosure of Japanese Patent Application No. 2013-162458 filed on Aug. 5, 2013 including the specification, drawings and abstract is incorporated herein by reference in its entirety.

BACKGROUND OF THE INVENTION

1. Field of the Invention

The present invention relates to a hybrid vehicle equipped with a rotary electrical machine and an internal combustion engine and a vehicle control method.

2. Description of Related Art

Japanese Patent Application Publication No. 2010-234872 (JP 2010-234872 A) discloses a hybrid vehicle in which an internal combustion engine is started in a predetermined time after vehicle request power exceeds a start threshold value when the vehicle request power is greater than the start threshold value of the internal combustion engine.

The hybrid vehicle may travel in any one travel mode out of plural driving modes of a driving mode in which the vehicle continues to perform motor driving using only a drive motor without sustaining a state of charge (SOC) of a power storage device and a driving mode in which the vehicle travels using the internal combustion engine with the SOC of the power storage device sustained. In such a hybrid vehicle, in order to secure drive power regardless of the driving mode, the internal combustion engine may be started when the vehicle request power is greater than the start threshold value. Accordingly, for example, when the vehicle request power is temporarily greater than the start threshold value due to a driver's rough operation of an accelerator or the like, the driving mode for sustaining the motor driving is selected, but the internal combustion engine may be started against the intention of the driver.

SUMMARY OF THE INVENTION

The present invention provides a vehicle and a vehicle control method that appropriately controls starting of the internal combustion engine depending on a state of a hybrid vehicle.

The vehicle according to the invention comprises: a rotary electrical machine; an internal combustion engine; a power storage device; and an electronic control unit. The rotary electrical machine and the internal combustion engine are configured to generate a drive force for the vehicle. The power storage device is configured to supply electric power to the rotary electrical machine. The electronic control unit is configured to control the rotary electrical machine and the internal combustion engine in any one driving mode out of a plurality of driving modes, the plurality of driving modes includes a first mode and a second mode, the first mode is a mode in which the vehicle travels using the electric power of the power storage device without sustaining a state of charge of the power storage device, the second mode is a mode in which the vehicle travels while sustaining the state of charge of the power storage device. When the conditions i) and ii) are satisfied, the electronic control unit is configured to control the internal combustion engine so as to delay starting of the internal combustion engine, which is based on a condition where a vehicle request power is greater than a start threshold value, than that in the second mode: i) a condition in which the driving mode is the first mode; and ii) a condition in which the vehicle request power requested to the vehicle is greater than the start threshold value, wherein the start threshold value is a value with which the internal combustion engine in a stopped state is started.

The vehicle control method according to the invention, in which the vehicle comprises a rotary electrical machine, an internal combustion engine, a power storage device, and a electronic control unit. The rotary electrical machine and the internal combustion engine generate a drive force for the vehicle. The power storage device generates a drive force for the rotary electrical machine. The vehicle control method comprising: controlling, by the electronic control unit, the rotary electrical machine and the internal combustion engine in any one driving mode out of a plurality of driving modes, the plurality of driving modes includes a first mode and a second mode, the first mode is a mode in which the vehicle travels using the electric power of the power storage device without sustaining a state of charge of the power storage device, the second mode is a mode in which the vehicle travels while sustaining the state of charge of the power storage device; and controlling, by the electronic control unit, the internal combustion engine so as to delay starting of the internal combustion engine, which is based on a condition where a vehicle request power is greater than a start threshold value, than that in the second mode when the conditions i) and ii) are satisfied: i) a condition in which the driving mode is the first mode; and ii) a condition in which the vehicle request power requested to the vehicle is greater than the start threshold value, the start threshold value is a value with which the internal combustion engine in a stopped state is started.

According to the present invention, when the vehicle request power is greater than the start threshold value in the first mode, the internal combustion engine is controlled so as to delay the starting of the internal combustion engine, which is based on a condition where the vehicle request power is greater than the start threshold value, than that in the second mode. As a result, even when the vehicle request power is temporarily greater than the start threshold value in the first mode due to a driver's rough operation of an accelerator, it is possible to prevent the internal combustion engine from being started at the time point at which the vehicle request power becomes greater than the start threshold value. That is, it is possible to prevent the internal combustion engine from being started against the intention of the driver. By delaying the starting of the internal combustion engine, it is possible to continuously perform the motor driving using only the rotary electrical machine. Therefore, the present invention can provide a vehicle and a vehicle control method that can appropriately control the starting of the internal combustion engine depending on the state of a hybrid vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the present invention will be described with reference to the accompanying drawings. In the below description, like elements are referenced by like reference signs. The names and the functions of the like elements are not changed. Accordingly, detailed description thereof will not be repeated.

The entire block diagram of a hybrid vehicle 1 (hereinafter, simply referred to as a vehicle 1) according to this embodiment will be described below with reference to FIG. 1. The vehicle 1 includes a transmission 8, an engine 10, a torsional damper 18, a power control unit (PCU) 60, a battery 70, driving wheels 72, a charging device 78, and an electronic control unit (ECU) 200.

The transmission 8 includes a drive shaft 16, a first motor-generator (hereinafter, referred to as a first MG) 20, a second motor-generator (hereinafter, referred to as a second MG) 30, a power distribution device 40, and a reduction gear 58.

The vehicle 1 travels with a drive force output from at least one of the engine 10 and the second MG 30. The dynamic power generated from the engine 10 is distributed to two paths by the power distribution device 40. One of the two paths is a path through which the dynamic power is transmitted to the driving wheels 72 via the reduction gear 58 and the other is a path through which the dynamic power is transmitted to the first MG 20.

The first MG 20 and the second MG 30 are, for example, three-phase AC rotary electrical machines. The first MG 20 and the second MG 30 are driven by the PCU 60.

The first MG 20 has a function of a generator that generates electric power using the dynamic power of the engine 10 distributed by the power distribution device 40 and charges the battery 70 via the PCU 60. The first MG 20 receives electric power from the battery 70 and causes a crank shaft as an output shaft of the engine 10 to rotate. Accordingly, the first MG 20 has a function of a starter that starts the engine 10.

The second MG 30 has a function of a driving motor that supplies a drive force to the driving wheels 72 using at least one of the electric power stored in the battery 70 and the electric power generated by the first MG 20. In addition, the second MG 30 has a function of a generator that charges the battery 70 using the electric power generated by generative braking via the PCU 60.

The engine 10 is an internal combustion engine such as a gasoline engine or a diesel engine and is controlled on the basis of a control signal S1 from the ECU 200.

A crank position sensor 11 is disposed at a position opposed to the crank shaft of the engine 10. The crank position sensor 11 detects a rotation speed Ne of the engine 10. The crank position sensor 11 transmits a signal indicating the detected rotation speed Ne of the engine 10 to the ECU 200.

The crank position sensor 11 may detect a rotation angle and an angular speed of the crank shaft of the engine 10 and the ECU 200 may calculate the rotation speed Ne of the engine 10 on the basis of the rotation angel and the angular speed received from the crank position sensor 11.

In this embodiment, the engine 10 includes four cylinders 112 from a first cylinder to a fourth cylinder. The vertex of each cylinder 112 is provided with an ignition plug (not illustrated).

Figure 1:
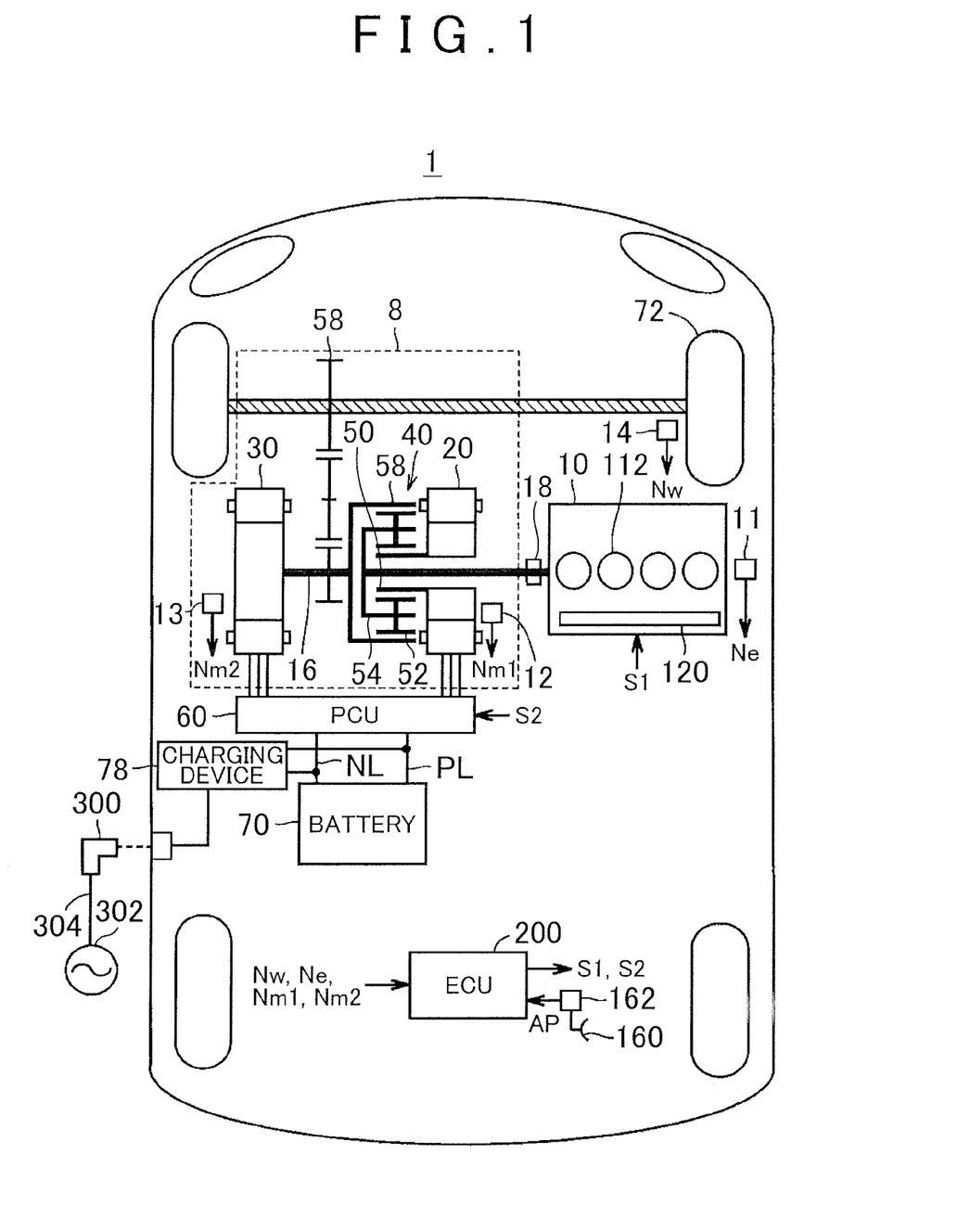
FIG. 1 is a block diagram illustrating the entire configuration of a vehicle.

The engine 10 is not limited to the in-line four-cylinder engine illustrated in FIG. 1. For example, the engine 10 may be various types of engines including plural cylinders such as in-line three cylinders, V-shaped six cylinders, V-shaped eight cylinders, and in-line six cylinders.

The engine 10 is provided with a fuel injection device 120 corresponding to each of the cylinders 112. The fuel injection device 120 may be disposed in each of the cylinders 112 or may be disposed in an intake port of each cylinder.

In the engine 10 having this configuration, the ECU 200 controls an amount of fuel injected for each cylinder 112 by injecting an appropriate amount of fuel into each of the cylinders 112 at an appropriate timing or stopping the injection of the fuel into the cylinders 112.

The torsional damper 18 is disposed between the crank shaft of the engine 10 and an input shaft of the transmission 8. The torsional damper 18 absorbs torque fluctuation at the time of transmitting dynamic power between the crank shaft of the engine 10 and the input shaft of the transmission 8.

The power distribution device 40 is a power transmission device that mechanically connects three elements of a drive shaft 16 connected to the driving wheels 72, the output shaft of the engine 10, and the rotating shaft of the first MG 20. The power distribution device 40 enables transmission of dynamic power between the other two elements using one of the three elements as a reaction element. The rotating shaft of the second MG 30 is connected to the drive shaft 16.

The power distribution device 40 is a planetary gear mechanism including a sun gear 50, a pinion gear 52, a carrier 54, and a ring gear 56. The pinion gear 52 engages with the sun gear 50 and the ring gear 56. The carrier 54 rotatably supports the pinion gear 52 and is connected to the crank shaft of the engine 10. The sun gear 50 is connected to the rotating shaft of the first MG 20. The ring gear 56 is connected to the rotating shaft of the second MG 30 and the reduction gear 58 via the drive shaft 16.

The reduction gear 58 transmits the dynamic power from the power distribution device 40 or the second MG 30 to the driving wheels 72. The reduction gear 58 transmits a reaction force transmitted from the road surface to the driving wheels 72 to the power distribution device 40 or the second MG 30.

The PCU 60 converts DC power stored in the battery 70 into AC power for driving the first MG 20 and the second MG 30. The PCU 60 includes a converter and an inverter (both of which are not illustrated) controlled on the basis of a control signal S2 from the ECU 200. The converter boosts a voltage of the DC power supplied from the battery 70 and outputs the boosted voltage to the inverter. The inverter converts the DC power output from the converter into AC power and outputs the AC power to the first MG 20 and/or the second MG 30. Accordingly, the first MG 20 and/or the second MG 30 are driven using the dynamic power stored in the battery 70. The inverter converts AC power generated by the first MG 20 and/or the second MG 30 into DC power and outputs the DC power to the converter. The converter steps down the voltage of the DC power output from the inverter and outputs the stepped-down voltage to the battery 70. Accordingly, the battery 70 is charged with the electric power generated by the first MG 20 and/or the second MG 30. The converter may not be employed.

The battery 70 is a power storage device and is a DC power source rechargeable. For example, a secondary battery of nickel hydrogen or lithium ion is used as the battery 70. The voltage of the battery 70 is, for example, about 200 V. The battery 70 may be charged with the electric power generated by the first MG 20 and/or the second MG 30 as described above and may also be charged with electric power supplied from an external power source (not illustrated). The battery 70 is not limited to the secondary battery, but may be a device capable of generating a DC voltage, such as a capacitor, a solar cell battery, and a fuel cell battery. The vehicle 1 may be provided with a charging device enabling the charging of the battery 70 with the external power source.

The ECU 200 estimates the SOC of the battery 70 on the basis of the current, the voltage, and the battery temperature of the battery 70. The ECU 200 may estimate an open circuit voltage (OCV), for example, on the basis of the current, the voltage, and the battery temperature and may estimate the SOC of the battery 70 on the basis of the estimated OCV and a predetermined map. Alternatively, the ECU 200 may estimate the SOC of the battery 70, for example, by integrating the charging current and the discharging current of the battery 70.

A charging device 78 charges the battery 70 with the electric power supplied form an external power source 302 by attaching a charging plug 300 to the vehicle 1 while the vehicle 1 is stopped. The charging plug 300 is connected to one end of a charging cable 304. The other end of the charging cable 304 is connected to the external power source 302. The positive electrode terminal of the charging device 78 is connected to a power supply line PL connecting the positive electrode terminal of the PCU 60 and the positive electrode terminal of the battery 70. The negative electrode terminal of the charging device 78 is connected to an earth line NL connecting the negative electrode terminal of the PCU 60 and the negative electrode terminal of the battery 70. In addition to or instead of the charging method of supplying electric power from the external power source 302 to the battery 70 of the vehicle 1 by contact power supply using the charging plug 300 or the like, a charging method of supplying electric power from the external power source 302 to the battery 70 of the vehicle 1 by noncontact power supply such as a resonance method or an electromagnetic induction method may be used.

A first resolver 12 is disposed in the first MG 20. The first resolver 12 detects the rotation speed Nm1 of the first MG 20. The first resolver 12 transmits a signal indicating the detected rotation speed Nm1 to the ECU 200.

A second resolver 13 is disposed in the second MG 30. The second resolver 13 detects the rotation speed Nm2 of the second MG 30. The second resolver 13 transmits a signal indicating the detected rotation speed Nm2 to the ECU 200.

A vehicle wheel speed sensor 14 detects the rotation speed Nw of the driving wheels 72. The vehicle wheel speed sensor 14 transmits a signal indicating the detected rotation speed Nw to the ECU 200. The ECU 200 calculates a vehicle speed V on the basis of the received rotation speed Nw. The ECU 200 may calculate the vehicle speed V on the basis of the rotation speed Nm2 of the second MG 30 instead of the rotation speed Nw.

The accelerator pedal 160 is disposed in a driver seat. The accelerator pedal 160 is provided with a pedal stroke sensor 162. The pedal stroke sensor 162 detects a degree of stroke AP on the accelerator pedal 160 (an operation amount of the accelerator pedal). The pedal stroke sensor 162 transmits a signal indicating the degree of stroke AP to the ECU 200. An accelerator pedal stepping force sensor for detecting a stepping force of a driver of the vehicle 1 on the accelerator pedal 160 may be used instead of the pedal stroke sensor 162.

The ECU 200 generates a control signal S1 for controlling the engine 10 and outputs the generated control signal S1 to the engine 10. The ECU 200 generates the control signal S2 for controlling the PCU 60 and outputs the generated control signal S2 to the PCU 60.

The ECU 200 is a controller that controls the entire operations of a hybrid system, that is, the charging and discharging states of the battery 70 and the operating states of the engine 10, the first MG 20, and the second MG 30, so as to allow the vehicle 1 to most efficiently travel by controlling the engine 10, the PCU 60, and the like.

The ECU 200 calculates vehicle request power corresponding to the degree of stroke AP of the accelerator pedal 160 disposed in the driver seat and the vehicle speed V. The ECU 200 adds power required for operation of an auxiliary device to the vehicle request power when the auxiliary device is operated. Here, the auxiliary device is, for example, an air conditioner. The ECU 200 controls the torque of the first MG 20, the torque of the second MG 30, and the output power of the engine 10 on the basis of the calculated vehicle request power.

In this embodiment, the ECU 200 controls the PCU 60 and the engine 10 in any driving mode of a driving mode (hereinafter, referred to as a charge depleting (CD) mode) in which the vehicle travels using the electric power of the battery 70 without sustaining the SOC of the battery 70 and a driving mode (hereinafter, referred to as a charge sustaining (CS) mode) in which the engine 10 is activated or stopped and the vehicle travels with the SOC of the battery 70 sustained. The driving modes may include a driving mode other than the CD mode and the CS mode.

The ECU 200 automatically switches the driving mode, for example, to the CD mode and the CS mode. The ECU 200 controls the PCU 60 and the engine 10 in the CD mode, for example, when the SOC of the battery 70 is greater than a threshold value SOC(1), and controls the PCU 60 and the engine 10 in the CS mode when the SOC of the battery 70 is less than the threshold value SOC(1). The ECU 200 may manually switch the driving mode to the CD mode and the CS mode.

When the vehicle 1 travels in the CD mode, the operation of the engine 10 for generating power is suppressed and the decrease in the SOC of the battery 70 is allowed. Accordingly, the SOC of the battery 70 is not sustained, the electric power of the battery 70 is consumed with an increase in the travel distance, and thus the SOC of the battery 70 decreases.

The ECU 200 controls the PCU 60 so as to cause the vehicle 1 to travel using the output power of the second MG 30 when the vehicle request power is not greater than a start threshold value Pr(1) of the engine 10 in the CD mode.

When the vehicle 1 travels using only the output power of the second MG 30 in the CD mode, it is determined that the vehicle request power is greater than the start threshold value Pr(1) of the engine 10, that is, that the output power of the second MG 30 cannot cover the vehicle request power. Accordingly, the ECU 200 starts the engine 10 and controls the PCU 60 and the engine 10 so as to cover the vehicle request power with the output power of the second MG 30 and the output power of the engine 10. That is, the CD mode is a driving mode in which the operation of the engine 10 for generating power is suppressed but the operation of the engine 10 for covering the vehicle request power is possible.

When the vehicle 1 travels in the CS mode, the engine 10 can be operated to generate power. That is, by operating the engine 10 to sustain the SOC of the battery 70 or to recover the SOC of the battery 70, the decrease in the SOC of the battery 70 is suppressed.

The ECU 200 may perform a charging and discharging control of the battery 70, for example, so that the SOC of the battery 70 is within a predetermined control range in the CS mode. The predetermined control range is, for example, a control range including the above-mentioned threshold value SOC(1). The ECU 200 may perform the charging and discharging control of the battery 70 so that the SOC of the battery 70 is sustained to a predetermined target SOC. The target SOC is, for example, the threshold value SOC(1).

The charging control of the battery 70 includes a charging control using regenerative power generated by regenerative braking of the second MG 30 and a charging control using the power generated by the first MG 20 using the dynamic power of the engine 10.

In the CS mode, when the SOC of the battery 70 exceeds the predetermined control range or is much greater than the predetermined target SOC and when the vehicle request power is not greater than the start threshold value Pr(2) of the engine 10, the ECU 200 controls the PCU 60 so that the vehicle travels using only the output power of the second MG 30.

When the vehicle 1 travels using only the output power of the second MG 30 in the CS mode as described above, it is determined that the vehicle request power is greater than the start threshold value Pr(2) of the engine 10, that is, that the vehicle request power is not covered with the output power of the second MG 30. Accordingly, the ECU 200 starts the engine 10 and controls the PCU 60 and the engine 10 so as to cover the vehicle request power with the output power of the second MG 30 and the output power of the engine 10. That is, the CS mode is a driving mode in which both the operation of the engine 10 for generating power and the operation of the engine 10 for covering the vehicle request power are possible.

In this embodiment, the start threshold value Pr(1) in the CD mode is greater than the start threshold value Pr(2) in the CS mode, but the start threshold value Pr(1) in the CD mode may be equal to the start threshold value Pr(2) in the CS mode. The start threshold values Pr(1) and Pr(2) are less than or equal to an upper limit value of the output power of the second MG 30 and less than or equal to an upper limit value (Wout) of the output power of the battery 70.

In the vehicle having the above-mentioned configuration, when the vehicle request power is greater than the start threshold value so as to secure the driving power, the engine 10 may be started regardless of the driving mode. Accordingly, for example, when the driver's operation of the accelerator is rough, the vehicle request power may be temporarily greater than the start threshold value. In this case, although the CD mode for continuously performing the motor driving is selected, the engine 10 may be started against the intention of the driver.

Therefore, in this embodiment, when the vehicle request power is greater than the start threshold value in the CD mode, the ECU 200 controls the engine 10 so as to delay the starting of the engine 10, which is based on the condition in which the vehicle request power is greater than the start threshold value, than that in the CS mode.

Specifically, when the vehicle request power is greater than the start threshold value of the engine 10 in the CD mode, the ECU 200 controls the engine 10 so as to delay the starting of the engine 10 than that in the CS mode by calculating an integrated value of excessive power of the vehicle request power with respect to the start threshold value and starting the engine 10 when the calculated integrated value is greater than a predetermined value.

In this embodiment, when the vehicle request power is greater than the start threshold value of the engine 10 in the CS mode, the ECU 200 starts the engine 10 at the time point at which the vehicle request power becomes greater than the start threshold value.

Figure 2:
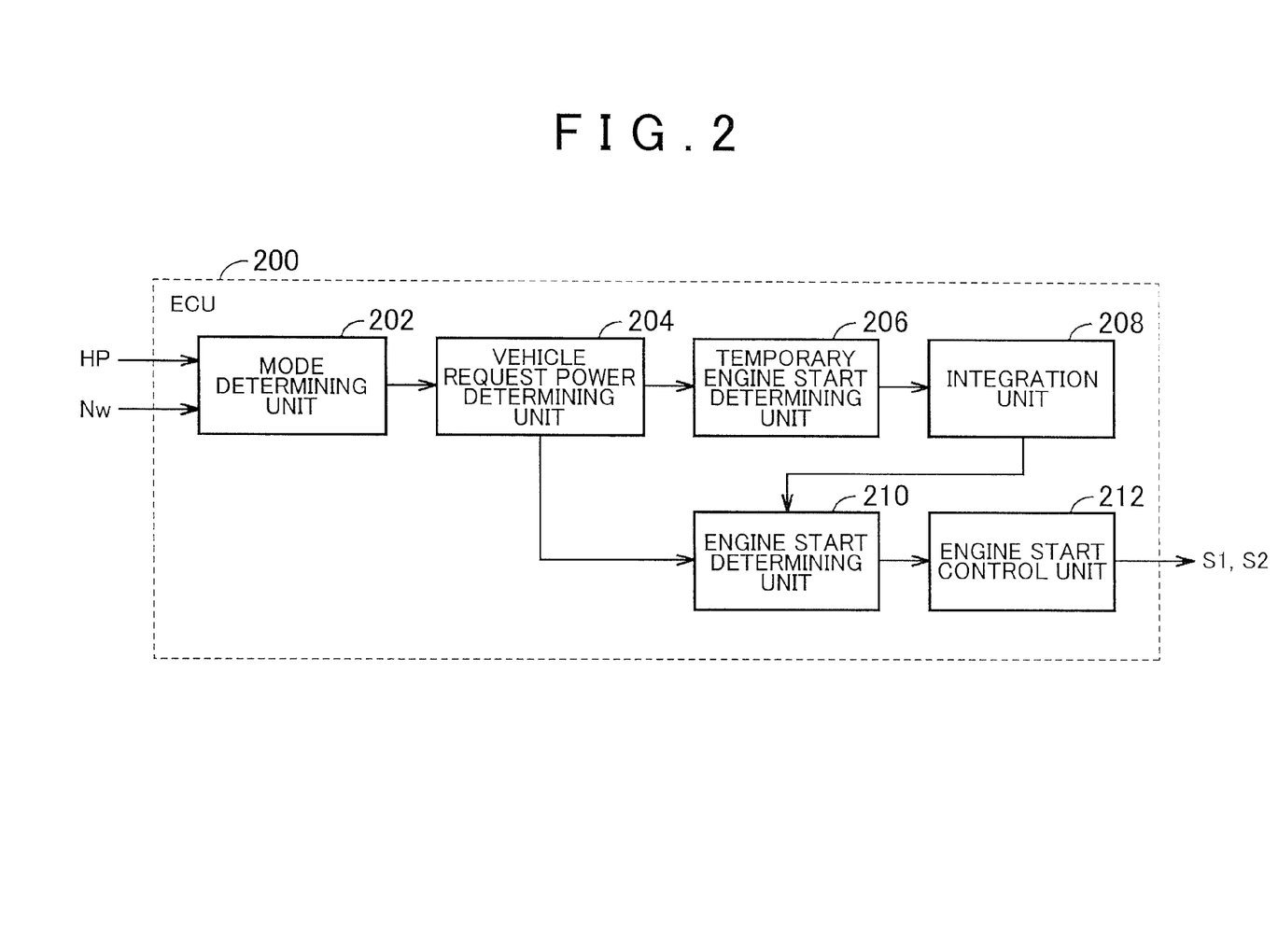
FIG. 2 is a functional block diagram of an electronic control unit (ECU)

FIG. 2 illustrates a functional block diagram of the ECU 200 mounted on the vehicle 1 according to this embodiment. The ECU 200 includes a mode determining unit 202, a vehicle request power determining unit 204, a temporary engine start determining unit 206, an integration unit 208, an engine start determining unit 210, and an engine start control unit 212.

The mode determining unit 202 determines whether a current driving mode is the CD mode, that is, whether a current driving mode is the CD mode or the CS mode. The mode determining unit 202 may determine whether the current driving mode is the CD mode, for example, with reference to a predetermined storage area in which information indicating the current driving mode is stored. The mode determining unit 202 may set a mode determination flag to an ON state, for example, when it is determined that the current driving mode is the CD mode.

The vehicle request power determining unit 204 determines whether the vehicle request power calculated on the basis of the degree of stroke AP of the accelerator pedal 160 and the vehicle speed V is greater than the start threshold value of the engine 10.

In the CD mode, the vehicle request power determining unit 204 determines whether the vehicle request power is greater than the start threshold value Pr(1) corresponding to the CD mode. In the CS mode, the vehicle request power determining unit 204 determines whether the vehicle request power is greater than the start threshold value Pr(2) corresponding to the CS mode. The vehicle request power determining unit 204 may set a request power determination flag to an ON state, for example, when it is determined that the vehicle request power is greater than the start threshold value.

The temporary engine start determining unit 206 sets a temporary engine start determination flag to an ON state when the driving mode is the CD mode and the vehicle request power is greater than the start threshold value Pr(1). The temporary engine start determining unit 206 may set the temporary engine start determination flag to the ON state, for example, when both the mode determination flag and the request power determination flag are set to the ON state.

When the temporary engine start determination flag is in the ON state, the integration unit 208 calculates an integrated value of the excessive power of the vehicle request power with respect to the start threshold value Pr(1) after the temporary engine start determination flag is switched to the ON state. Specifically, the integration unit 208 calculates the integrated value, for example, by multiplying the excessive power by a sampling time and adding the multiplied value for each calculation cycle. The integrated value is reset to an initial value (for example, zero), for example, when the temporary engine start determination flag is switched to the ON state or when the engine 10 is started.

The engine start determining unit 210 sets an engine start determination flag to an ON state when the vehicle request power is greater than the start threshold value Pr(2) in the CS mode. The engine start determining unit 210 sets the engine start determination flag to the ON state when the integrated value calculated by the integration unit 208 is greater than a predetermined value. The engine start determining unit 210 sets the engine start determination flag to the ON state even when the integrated value is not greater than the predetermined value but a predetermined time elapses after the calculation of the integrated value by the integration unit 208 is started.

The engine start control unit 212 performs a start control of the engine 10 when the engine start determining unit 210 determines that the engine start determination flag is in the ON state. The engine start control unit 212 generates the control signals S1 and S2 for controlling the first MG 20 and the engine 10 and transmits the generated control signals to the PCU 60 and the engine 10.

Specifically, the engine start control unit 212 cranks the engine 10 using the first MG 20 to raise the rotation speed of the engine 10 up to a rotation speed or higher at which an initial explosion is possible. By performing an ignition control and a fuel injection control after the rotation speed of the engine 10 becomes higher than or equal to the rotation speed at which an initial explosion is possible, the engine 10 is operated (started). The engine start determination flag or the temporary engine start determination flag are switched to an OFF state, for example, at the same time as performing the start control of the engine 10.

This embodiment describes that all of the mode determining unit 202, the vehicle request power determining unit 204, the temporary engine start determining unit 206, the integration unit 208, the engine start determining unit 210, and the engine start control unit 212 serve as software and are embodied by causing the CPU of the ECU 200 to execute a program stored in the memory, but the functional units may be embodied by hardware. The program is recorded on a recording medium, which is mounted on the vehicle.

The control structure of the program that is executed by the ECU 200 mounted on the vehicle according to this embodiment will be described below with reference to FIGS. 3 and 4.

Figure 3:
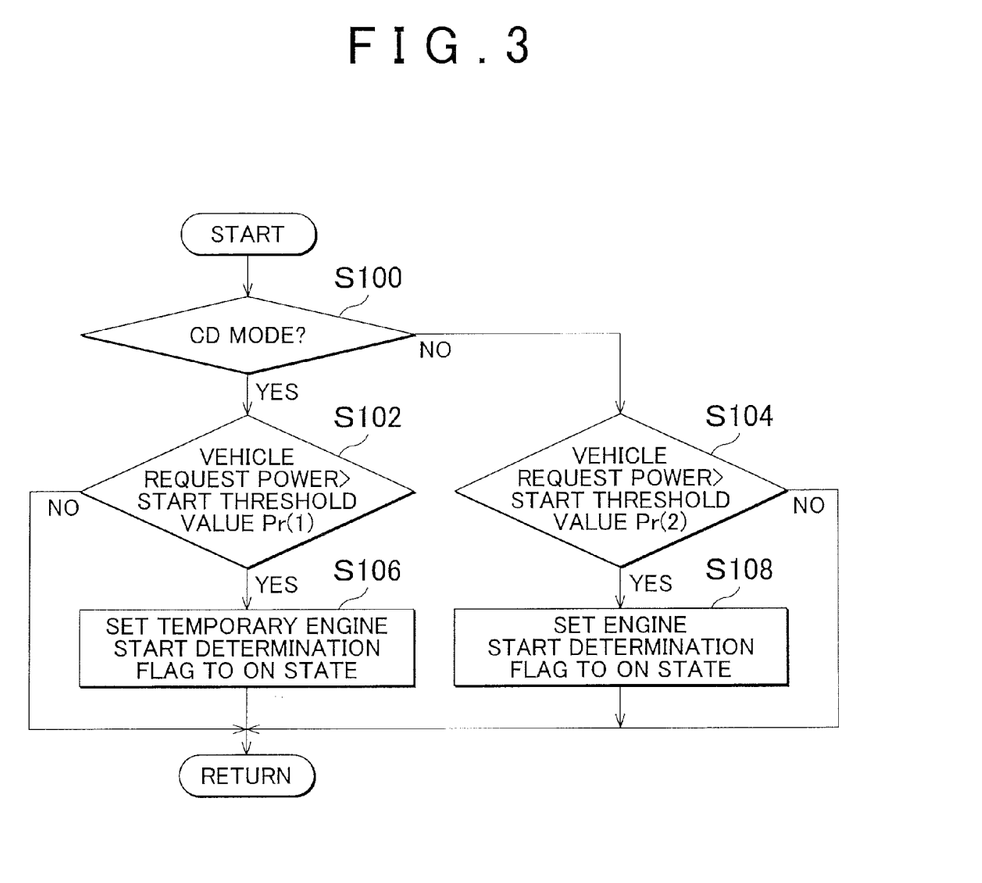
FIG. 3 is a flowchart (first part) illustrating a control structure of a program that is executed by the ECU.

As illustrated in FIG. 3, in step (hereinafter, step is referred to as "S") 100, the ECU 200 determines whether the current driving mode is the CD mode. When it is determined that the current driving mode is the CD mode (YES in S100), the process flow goes to S102. Otherwise (NO in S100), the process flow goes to S104.

In S102, the ECU 200 determines whether the vehicle request power is greater than the start threshold value Pr(1) corresponding to the CD mode. When it is determined that the vehicle request power is greater than the start threshold value Pr(1) corresponding to the CD mode (YES in S102), the process flow goes to S106. Otherwise (NO in S102), the process flow ends.

In S104, the ECU 200 determines whether the vehicle request power is greater than the start threshold value Pr(2) corresponding to the CS mode. When it is determined that the vehicle request power is greater than the start threshold value Pr(2) corresponding to the CS mode (YES in S104), the process flow goes to S108. Otherwise (NO in S104), the process flow ends.

In S106, the ECU 200 sets the temporary engine start determination flag to the ON state. In S108, the ECU 200 sets the engine start determination flag to the ON state.

Figure 4:
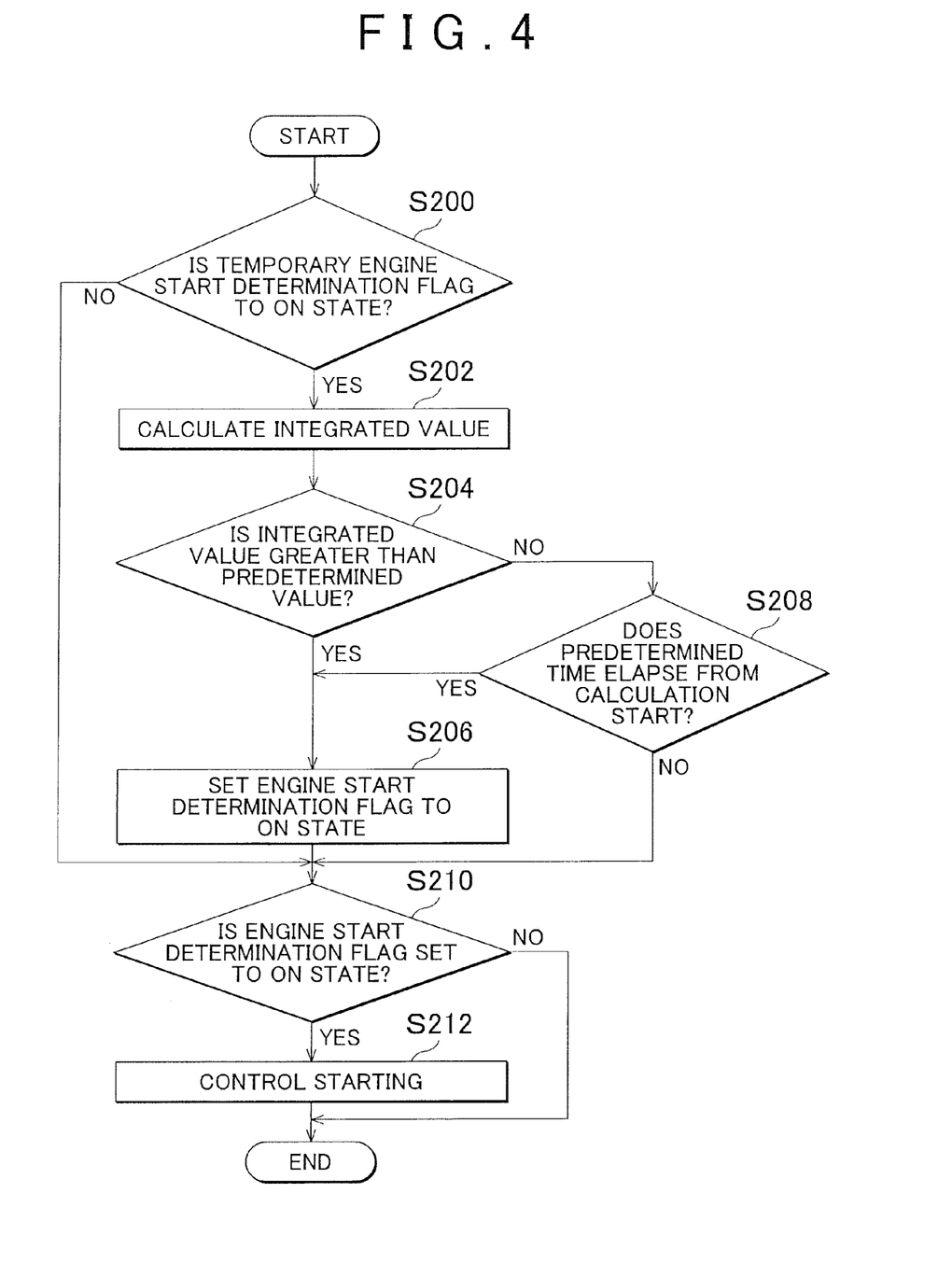
FIG. 4 is a flowchart (second part) illustrating the control structure of the program that is executed by the ECU.

Referring to FIG. 4, in S200, the ECU 200 determines whether the temporary engine start determination flag is in the ON state. When it is determined that the temporary engine start determination flag is in the ON state (YES in S200), the process flow goes to S202. Otherwise (NO in S200), the process flow goes to S210.

In S202, the ECU 200 calculates the integrated value by integrating the excessive power of the vehicle request power with respect to the start threshold value Pr(1). The method of calculating the integrated value is the same as described above and thus detailed description thereof will not be repeated.

In S204, the ECU 200 determines whether the calculated integrated value is greater than a predetermined value. When it is determined that the calculated integrated value is greater than the predetermined value (YES in S204), the process flow goes to S206. Otherwise (NO in S204), the process flow goes to S208. In S206, the ECU 200 sets the engine start determination flag to the ON state.

In S208, the ECU 200 determines whether a predetermined time elapses after the calculation of the integrated value is started. When it is determined that the predetermined time elapses after the calculation of the integrated value is started (YES in S208), the process flow goes to S206. Otherwise (NO in S208), the process flow goes to S210.

In S210, the ECU 200 determines whether the engine start determination flag is in the ON state. When it is determined that the engine start determination flag is in the ON state (YES in S210), the process flow goes to S212. Otherwise (NO in S210), the process flow ends.

In S212, the ECU 200 performs the start control of the engine 10. The start control of the engine 10 is the same as described above and thus detailed description thereof will not be repeated.

Figure 5:
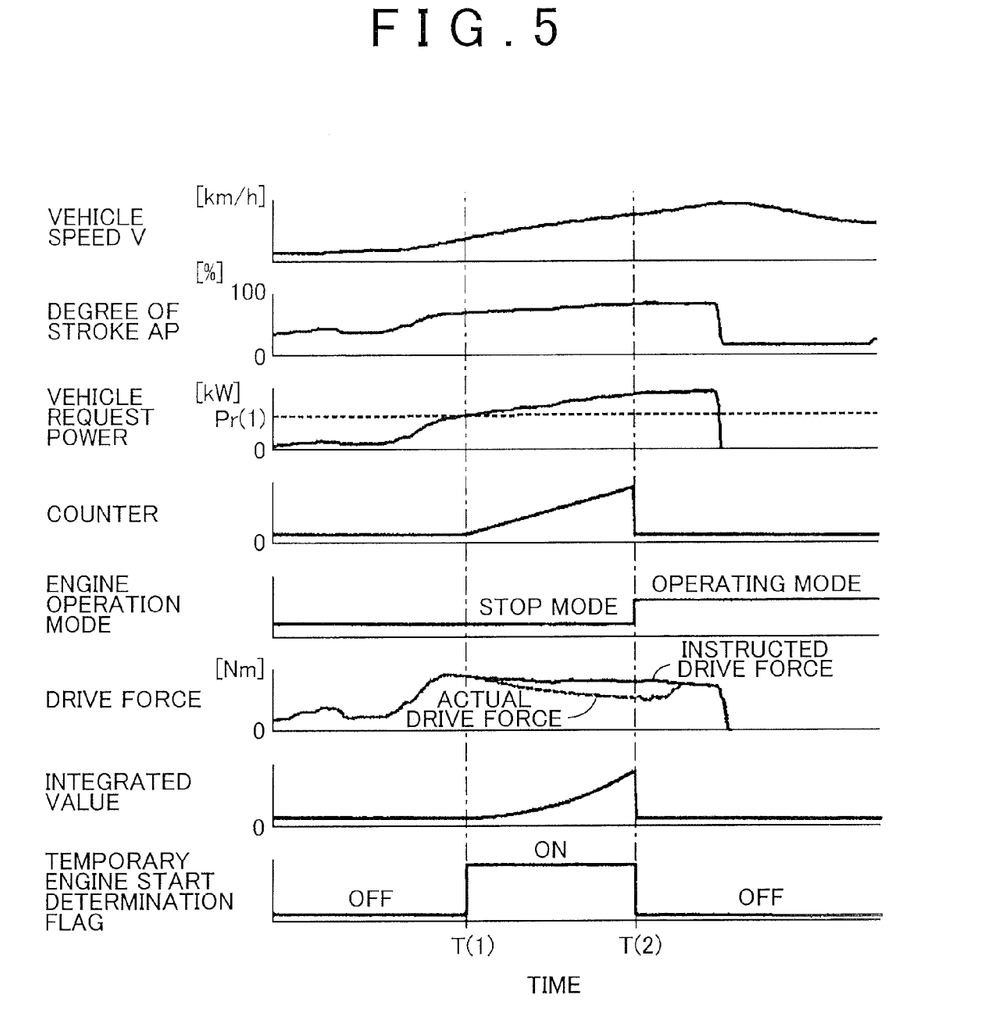
FIG. 5 is a timing diagram illustrating operations of the ECU.

The operations of the ECU 200 mounted on the vehicle 1 according to this embodiment based on the above-mentioned structure and the above-mentioned flowchart will be described with reference to FIG. 5.

For example, it is assumed that the vehicle 1 travels at a low speed and at a small degree of accelerator opening in the state where the engine 10 is stopped (engine stop mode) in the CD mode (YES in S100). The small degree of accelerator opening means a state where the vehicle request power is covered with only the output power of the second MG 30. A counter illustrated in FIG. 5 is a counter for measuring the time after the calculation of the integrated value is started as described above.

When a driver increases the degree of stroke AP of the accelerator pedal 160, the vehicle request power increases with the increase in the degree of stroke AP. The output power of the second MG 30 increases with the increase in the vehicle request power, the actual drive force increases, and the vehicle speed V increases.

When the vehicle request power is greater than the start threshold value Pr(1) corresponding to the CD mode at time T(1) (YES in S102), the temporary engine start determination flag is set to the ON state (S106). Since the temporary engine start determination flag is in the ON state (YES in S200), the calculation of the integrated value is started (S202). Until the integrated value reaches the predetermined value (NO in S204), the start control of the engine 10 is not performed and thus the EV traveling is continued. The vehicle speed V increases with the increase in the output power of the second MG 30. Since both the vehicle request power and the vehicle speed V tend to increase, the instructed drive force based on the vehicle request power is changed to sustain an almost constant state. On the other hand, since the output power of the second MG 30 is not generated to exceed the upper limit value with the increase of the vehicle speed V (the output power of the second MG 30 reaches a limit point), the actual drive force decreases with the increase of the vehicle speed V.

When the integrated value is greater than the predetermined value at time T(2) (YES in S204), the engine start determination flag is set to the ON state (S206). Since the engine start determination flag is in the ON state (YES in S210), the start control of the engine 10 is performed (S212), the engine 10 is started, and the engine 10 is in the operating mode. When the value of the counter becomes greater than or equal to the predetermined value before the integrated value does not become greater than the predetermined value (NO in S204), that is, when a predetermined time elapses after the calculation of the integrated value is started (YES in S208), the engine start determination flag is set to the ON state (S206).

On the other hand, it is assumed that the vehicle 1 travels at a low speed and at a small degree of accelerator opening in the state where the engine 10 is stopped (that is, in the state where the vehicle request power is covered with only the output power of the second MG 30) in the CS mode (NO in S100).

When the driver increases the degree of stroke AP of the accelerator pedal 160, the vehicle request power increases with the increase in the degree of stroke AP. With the increase in the vehicle request power, the output power of the second MG 30 increases, the actual drive force increases, and the vehicle speed V increases.

When the vehicle request power is greater than the start threshold value Pr(2) corresponding to the CS mode (YES in S104), the engine start determination flag is set to the ON state (S108). Since the engine start determination flag is in the ON state (NO in S200 and YES in S210), the start control of the engine 10 is performed (S210) and the engine 10 is started.

In this way, the start control of the engine 10 is performed at the time point at which the vehicle request power becomes greater than the start threshold value Pr(2) in the CS mode. On the contrary, in the CD modes, the calculation of the integrated value is started when the vehicle request power is greater than the start threshold value Pr(1) and the start control of the engine 10 is performed at the time point at which the calculated integrated value becomes greater than the predetermined value posterior to the time point at which the vehicle request power becomes greater than the start threshold value Pr(1).

In the vehicle according to this embodiment having the above-mentioned configuration, when the vehicle request power is greater than the start threshold value in the CD mode, the engine 10 is controlled so as to delay the starting of the engine 10, which is based on the condition in which the vehicle request power is greater than the start threshold value, than that in the CS mode. It is assumed that the vehicle request power is temporarily greater than the start threshold value due to the driver's irregular operation of the accelerator in the CD mode. In the vehicle according to this embodiment, even in this case, it is possible to suppress the starting of the engine 10 at the time point at which the vehicle request power becomes greater than the start threshold value and to suppress the starting of the engine 10 against the intention of the driver. By delaying the starting of the engine 10, it is possible to continuously perform the motor driving using only the output power of the second MG 30. Accordingly, it is possible to provide a vehicle that can appropriately control the starting of the internal combustion engine depending on the state of the hybrid vehicle.

When the driver applies a strong force to the accelerator pedal with the intention of acceleration, the integrated value rapidly increases. Accordingly, it is possible to early start the engine 10 and to generate the drive force intended by the driver.

In the CS mode, since the engine 10 is started earlier than in the CD mode, it is possible to rapidly start the charging of the battery 70 and to sustain the SOC or to recover the SOC.

Modification examples of the present invention will be described below. The above-mentioned embodiment describes that the operation of the engine 10 for securing the drive power is possible in the CD mode, but, for example, the operation of the engine 10 in the CD mode may be inhibited. In this case, the ECU 200 may start the engine 10 after the driving mode is switched from the CD mode to the CS mode, when the vehicle request power is greater than the start threshold value in the CD mode and the integrated value is greater than the predetermined value.

The above-mentioned embodiment describes that the cranking of the engine 10 using the first MG 20 is started at the time point at which the integrated value becomes greater than the predetermined value. However, for example, the engine 10 may be cranked so as to cause the rotation speed of the engine to reach a rotation speed at which an initial explosion is possible using the first MG 20 until the integrated value is greater than the predetermined value. Accordingly, the engine 10 can be rapidly activated at the time point at which the integrated value becomes greater than the predetermined value.

In the above-mentioned embodiment, a case where the driver irregularly operates the accelerator is described as an example of the case where the vehicle request power is temporarily greater than the start threshold value. Another example thereof is a case where the traveling road has large up and down fluctuation, that is, the height difference in a short distance is large, in a cruise control of controlling the PCU 60 and the engine 10 so as to keep the speed of the vehicle 1 constant.

The above-mentioned embodiment describes that the calculation of the integrated value is started after the vehicle request power becomes greater than the start threshold value, and the engine 10 is started when the calculated integrated value is greater than the predetermined value in the CD mode. For example, after the calculation of the integrated value is started, the integrated value may be reset to an initial value (zero) whenever the vehicle request power becomes greater than the start threshold value.

The above-mentioned embodiment describes, that the integrated value is calculated only in the CD mode, but the calculation of the integrated value may also be started after the vehicle request power becomes greater than the start threshold value in the CS mode. In this case, it is preferable that the predetermined value of the integrated value in the CS mode be less than the predetermined value of the integrated value in the CD mode. Accordingly, it is possible to delay the starting of the engine 10, which is based on the condition in which the vehicle request power is greater than the start threshold value, in the CD mode than that in the CS mode.

For example, in S204 of FIG. 4, when the vehicle request power is greater than the start threshold value in the CD mode, an integrated value of excessive stroke with respect to a predetermined value (an example of "a first value") of the degree of stroke AP on the accelerator pedal 160 may be calculated and the engine 10 may be started when the calculated integrated value is greater than a predetermined value (an example of "a second value"). The predetermined value of the degree of stroke AP may be zero or may be a degree of stroke AP at the time point at which the vehicle request power is greater than the start threshold value. With this configuration, it is also possible to delay the starting of the engine 10, which is based on the condition in which the vehicle request power is greater than the start threshold value, in the CD mode than that in the CS mode. Alternatively, a starting wait time until the engine 10 is started after the vehicle request power becomes greater than the start threshold value in the CD mode may be set to be longer than that in the CS mode. With this configuration, it is also possible to delay the starting of the engine 10, which is based on the condition in which the vehicle request power is greater than the start threshold value, in the CD mode than that in the CS mode. All or a part of the above-mentioned modification examples may be combined and put into practice.

The above-mentioned embodiment is only an example in all points and is not restrictive. The scope of the present invention is not defined by the above description but by the appended claims, and it is intended that the present invention includes all modifications having meanings and scopes equivalent to the appended claims.

What is claimed is:

1. A vehicle comprising:
a rotary electrical machine configured to generate a drive force for the vehicle;
an internal combustion engine configured to generate the drive force for the vehicle;
a power storage device configured to supply electric power to the rotary electrical machine; and
an electronic control unit configured to control the rotary electrical machine and the internal combustion engine in any one driving mode out of a plurality of driving modes, the plurality of driving modes including a first mode and a second mode, the first mode being a mode in which the vehicle travels using the electric power of the power storage device without sustaining a state of charge of the power storage device, and the second mode being a mode in which the vehicle travels while sustaining the state of charge of the power storage device,
when conditions i) and ii) are satisfied, the electronic control unit being configured to control the internal combustion engine so as to delay starting of the internal combustion engine, which is based on a condition where a vehicle request power is greater than a start threshold value, than that in the second mode:
i) a condition in which the driving mode is the first mode; and
ii) a condition in which the vehicle request power requested to the vehicle is greater than the start threshold value, wherein the start threshold value is a value with which the internal combustion engine in a stopped state is started.

2. The vehicle according to claim 1, wherein
when the conditions i) and ii) are satisfied, the electronic control unit is configured to control the internal combustion engine so as to delay the starting of the internal combustion engine, which is based on a condition where the vehicle request power is greater than the start threshold value, than that in the second mode by performing operations v) and vi):
v) an operation of calculating a first integrated value that is an integrated value of excessive power of the vehicle request power with respect to the start threshold value; and
vi) an operation of starting the internal combustion engine when the first integrated value is greater than a predetermined value.

3. The vehicle according to claim 1, wherein
when the conditions i) and ii) are satisfied, the electronic control unit is configured to control the internal combustion engine so as to delay the starting of the internal combustion engine, which is based on a condition where the vehicle request power is greater than the start threshold value, than that in the second mode by performing operations vii) and viii):
vii) an operation of calculating a second integrated value that is an integrated value of excessive value of an operation amount of an accelerator pedal with respect to a first value; and viii) an operation of starting the internal combustion engine when the second integrated value is greater than a second value.

4. The vehicle according to claim 1, wherein
when the conditions i) and ii) are satisfied, the electronic control unit is configured to start the internal combustion engine when a predetermined time is elapsed after the vehicle request power exceeds the start threshold value.

5. The vehicle according to claim 1, wherein
the start threshold value is a value less than or equal to an upper limit value of output power of the rotary electrical machine,
the start threshold value in the first mode is a first threshold value, and
the start threshold value in the second mode is a second threshold value and the second threshold value is less than the first threshold value.

6. The vehicle according to claim 1, wherein
when the conditions i) and ii) are satisfied, the electronic control unit is configured to start the internal combustion engine.

7. The vehicle according to claim 1, wherein the electronic control unit is configured to inhibit the starting of the internal combustion engine when the driving mode is the first mode, and
when the conditions i) and ii) are satisfied the electronic control unit is configured to start the internal combustion engine after the driving mode is switched from the first mode to the second mode.

8. A vehicle control method, in which the vehicle comprises a rotary electrical machine, an internal combustion engine, a power storage device, and an electronic control unit the rotary electrical machine and the internal combustion engine generate a drive force for the vehicle, and the power storage device generates a drive force for the rotary electrical machine, the vehicle control method comprising:
controlling, by the electronic control unit, the rotary electrical machine and the internal combustion engine in any one driving mode out of a plurality of driving modes, the plurality of driving modes including a first mode and a second mode, the first mode being a mode in which the vehicle travels using the electric power of the power storage device without sustaining a state of charge of the power storage device, the second mode being a mode in which the vehicle travels while sustaining the state of charge of the power storage device; and
controlling, by the electronic control unit, the internal combustion engine so as to delay starting of the internal combustion engine, which is based on a condition where a vehicle request power is greater than a start threshold value, than that in the second mode when conditions i) and ii) are satisfied:
i) a condition in which the driving mode is the first mode; and
ii) a condition in which the vehicle request power requested to the vehicle is greater than the start threshold value, wherein the start threshold value is a value with which the internal combustion engine in a stopped state is started.

* * * * *